Patented May 2, 1950

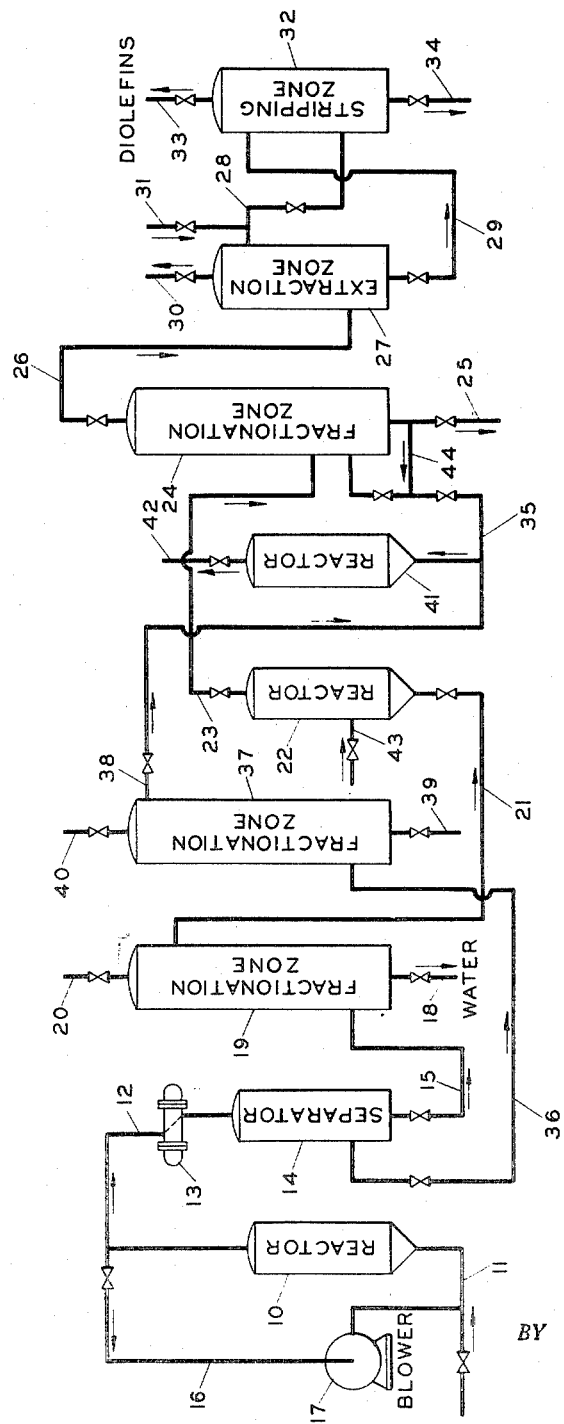

2,506,065

UNITED STATES PATENT OFFICE 2,506,065

PRODUCTION OF DIOLEFINS AND MOTOR FUEL FROM CARBON MONOXIDE AND HYDROGEN

Alfred Clark, Bartlesville, Okla., assignor to Phillips Petroleum Company, a corporation of Delaware Application January 2, 1948, Serial No. 239

7 Claims. (Cl. 260—450)

This invention relates to a process for producing hydrocarbons from carbon monoxide and hydrogen. In one of its embodiments this invention relates to a process for recovering valuable products from a mixture of hydrocarbons and oxygen-containing compounds. In another embodiment this invention relates to a process for manufacturing diolefins. In one of its more specific aspects, this invention relates to a process for manufacturing diolefins from oxygen-containing compounds produced in a Fischer-Tropsch synthesis over an iron catalyst.

The Fischer-Tropsch synthesis is a process whereby carbon monoxide and hydrogen are reacted with one another in various proportions to produce primarily hydrocarbons. This synthesis takes place over a suitable catalyst such as iron, nickel, or cobalt at suitable reaction conditions. Originally the Fischer-Tropsch synthesis utilized a fixed catalyst bed through which was passed the synthesis gas. The temperature of the catalyst had to be controlled within a very close range, otherwise no reaction would take place, the catalyst would become prematurely deactivated, or a great deal of carbon would be deposited. Further the volume of product hydrocarbons was relatively small for the volume of catalyst used and the overall expense of the process.

A great improvement of the Fischer-Tropsch process was made when it was adapted to a "fluid" type catalyst operation. This particular type of operation uses a finely divided catalyst in a powder form which is maintained suspended within the reactor in the charge gas by virtue of a sufficiently high flow rate of the latter. Under certain conditions it may be desirable to recycle a portion of the effluent materials to provide sufficient flow to keep the powdered catalyst in suspension. In this method of operation several improvements are made. Among them are the following: the size of the reactor is reduced, better temperature control is attained, the catalyst is easily regenerated without shutting down the reactor, and higher throughput and conversion are obtained as is greater economy. In this improvement of the Fischer-Tropsch synthesis of hydrocarbons an iron catalyst is most generally used, although nickel, cobalt, and others will work. An iron catalyst such as may be used is one comprising reduced iron oxide promoted with small amounts of potassium oxide and aluminum oxide. Some of the advantages of using an iron catalyst over the others are its ease of preparation, abundance, and relative cheapness.

In the operation of a Fischer-Tropsch synthesis to produce hydrocarbons using an iron catalyst, certain materials are produced in addition to the hydrocarbons. These materials are principally simple oxygen-containing compounds containing one to three carbon atoms per molecule, such as methanol, ethanol, propanol, acetone, and acetaldehyde. In addition to these materials, water is also produced. The volume of oxygen-containing materials produced is obviously of less interest to a petroleum producer than the hydrocarbons, and it would be to h's advantage if the synthesis gas converted to these materials would be converted to hydrocarbons instead. In an ideal situation, no oxygen-containing materials would be formed in a Fischer-Tropsch synthesis. The separation and refining of these oxygen-containing materials to a relatively pure and marketable state involves further and sometimes extensive treatment. Many of the oxygen-containing materials form azeotropes with water, thus making separation to high purity materials difficult and often expensive.

Under the present methods of operating a Fischer-Tropsch synthesis over an iron catalyst it is impossible to eliminate the production of certain oxygen-containing materials. It follows then that the next best approach would be an easy and economical process for converting such oxygen-containing materials to hydrocarbons.

An object of this invention is to provide a combination process for the synthesis of hydrocarbons from carbon monoxide and hydrogen. Another object is to provide a combination process for hydrocarbon synthesis, diolefin production, and hydrocarbon refining. Another object is to increase the yield of useful hydrocarbons from a Fischer-Tropsch synthesis. Another object is to provide a method for recovering a larger volume of hydrocarbon products, rather than hydrocarbons and oxygen-containing materials, from a Fischer-Tropsch synthesis. Another object is to avoid the necessity of complicated purification steps for turning oxygen-containing compounds into economically useful products. Another object is to increase the hydrocarbon yield of an oxygen-removing and olefin isomerizing step of a Fischer-Tropsch synthesis. A further object is to provide a process for the production of diolefin and heavier hydrocarbons from Fischer-Tropsch synthesis products formed over an iron catalyst. Another object is the production of diolefins and other hydrocarbons from unrefined oxygen-containing products of a Fischer-Tropsch synthesis conducted in the presence of an iron catalyst. Another object is the production of butadiene from unrefined oxygen-containing products derived from effluent of a Fischer-Tropsch synthesis. Further objects and advantages of this invention will be apparent to one skilled in the art from the accompanying disclosure and discussion.

I have discovered that there may be separated, from the aqueous phase from the effluent of a Fischer-Tropsch synthesis conducted in the presence of an iron catalyst, a fraction boiling below 100° C. and containing principally ethyl alcohol, some acetaldehyde, lesser amount of methanol, propanol, acetone, esters, and fatty acids, and from about 6 to 25 per cent water, and that this fraction may be used without further treatment for conversion to diolefins and more particularly to butadiene. I have also discovered that, in addition to the diolefins formed, high-boiling materials are produced which are chiefly unsaturated materials, boiling for the most part in the gas oil range, and formed by aldehyde polymerization. Further, I have discovered that these high-boiling materials may be treated to produce valuable constituents for motor fuel, and that this treatment may be carried out in conjunction with treatment of products of a similar boiling range separated from the non-aqueous portion of the effluents of the original Fischer-Tropsch synthesis.

In the practice of one preferred modification of this invention the following general procedure is carried out. Effluent from a Fischer-Tropsch synthesis, conducted in the presence of an iron catalyst and comprising hydrocarbons and oxygen-containing materials, is separated by suitable means into a hydrocarbon phase, and an aqueous phase which contains water-soluble oxygen-containing materials. These oxygen-containing compounds are recovered in the aqueous phase to the extent of from 10 to 25 per cent of the carbon monoxide converted. The aqueous phase is itself then separated into two fractions at a distillation cut point of about 100° C. The fraction boiling below 100° C. is an azeotropic mixture, usually containing from about 6 to about 25 per cent water, and is a suitable charge stock with no further refining for the production of diolefins, and more particularly butadiene.

I have found that suitable catalysts and operating conditions for the production of butadiene and other diolefins from the low-boiling fraction of the aqueous phase, are zinc oxide-alumina or magnesium oxide-silica, at temperatures within the range of 380 to 450° C., and pressures not greater than 20 pounds absolute. Tantalum oxide on silica gel may also be used at a temperature in the range of 300 to 375° C. and a pressure similar to that used for the other catalysts.

Further, I have found that yields of butadiene in the range of 27 to 40 pounds may be expected on the basis of 100 pounds of anhydrous ethyl alcohol. The maximum theoretical yield of butadiene is 58.7 pounds. Included in the products and in addition to the butadiene are $C_5$ and $C_6$ diolefins as well as some polymers and aldehyde condensation products. These last two materials are separated and refined along with the hydrocarbon phase from the Fischer-Tropsch synthesis. In addition, small portions of off-gases are also produced, comprising principally by-product hydrogen and lesser amounts of ethylene.

In the following description, one preferred method of operating my process is specifically disclosed. It is understood, however, that while this is representative in general of my process, various minor changes may be made in adapting the process to the various conditions within the scope of the invention.

A further understanding of some of the specific aspects of my invention may be had by referring to the accompanying drawing, which is a schematic flow diagram showing one arrangement of apparatus elements and flow of materials therethrough suitable for the practice of my invention. Various additional valves, pumps, fractionating columns and other conventional equipment necessary for the practice of this invention will be familiar to one skilled in the art and have been omitted from this drawing for the sake of clarity.

In the drawing, synthesis gas, comprising hydrogen and carbon monoxide, from a source not shown is introduced through line 11, to Fischer-Tropsch reactor 10, at a space velocity of 1500 to 3500 volumes of gas per volume of catalyst per hour, where it contacts a "fluid" iron catalyst at a temperature in the range of 290 to 325° C. and a pressure in the range of 70 to 450 pounds per square inch, producing hydrocarbons and oxygen-containing materials. Alcohols which are a portion of the oxygen-containing materials comprise about 2 to 5 per cent of the total $C_5$ and heavier hydrocarbon—oxygen-containing material product. A portion of the effluent from reactor 10 is passed through line 12 and condenser 13 to separator 14 where it is separated into a hydrocarbon phase and an aqueous phase containing oxygen-containing materials. These oxygen-containing materials are made up principally of alcohols, minor portions of aldehydes, ketones, esters, and fatty acids. A remaining portion of the Fischer-Tropsch effluent is recycled through line 16, blower 17, and line 11 to reactor 10 to aid in keeping the powdered iron catalyst suspended in the reactor.

The aqueous phase is withdrawn from the bottom of separator 14 through line 15 to fractionation zone 19 (which may comprise one or more fractional distillation columns and associated equipment) from which light gases are removed through line 20. An azeotrope fraction comprising oxygen-containing materials and not more than about 25 per cent water by weight, and boiling below 100° C. is removed through line 21 to diolefin-producing reactor 22. Suitable diluent materials, such as steam or nitrogen as are known to one skilled in the art, may be introduced to reactor 22 through line 43 in proportions ranging from 1 to 10 parts diluent per part of material treated. Additional water and other materials are removed from fractionation zone 19 through line 18. The azeotrope fraction boiling below 100° C. is contacted with a catalyst, such as zinc oxide-alumina, magnesium oxide-silica, or tantalum oxide on silica gel, at elevated temperatures and pressures as previously discussed. Products of this catalytic reaction are butadiene, pentadiene and hexadiene, lesser amounts of polymers and aldehyde condensation products, and small amounts of hydrogen and ethylene. In reactor 22 approximately 75 to 90 per cent of the oxygen-containing materials are converted to butadiene and lighter products, and the remainder to high-boiling materials. Included in the high-boiling materials are unsaturated products, boiling for the most part in the gas oil range, and produced principally by aldehyde polymerization. These total materials are removed from reactor 22 through line 23 to fractionation zone 24, where butadiene and lighter gases are taken overhead through line 26 to extraction zone 27, such as a furfural extraction tower. Other extraction media may be used with good results. Recycle extraction material is introduced to extraction zone 27 through line 28 and make up extraction material is introduced through lines 31 and 28. In extraction zone 27, light gases are separated from the butadiene and removed through line 30. Butadiene and any other heavier material present, e. g. pentadienes and hexadienes plus extracting material, are passed through line 29 to stripping zone 32 from which the butadiene is recovered overhead through line 33 as an additional hydrocarbon product of the process and passed to storage means not shown. This product may be further purified if desired. Extraction material is removed from stripping zone 32 and recycled through line 28 to extraction zone 27. Heavy products extracted with the butadiene in extraction zone 27 may be removed from stripping zone 32 through line 34 or otherwise separated by means well known in the art. Heavier materials than butadiene, which may include gasoline range materials and compounds boiling within the gas oil range, such as polymers, which are suitable for conversion to gasoline range hydrocarbons, are removed from fractionation zone 24 through line 35 to reactor 41. If desired, the total heavy product boiling above butadiene may be passed to reactor 41 through lines 25, 44, and 35. If this is undesirable, then the heavy material may be removed through line 25.

The hydrocarbon phase from separator 14 is passed through line 36 to fractionation zone 37 where light gases are removed through line 40. A highly olefinic fraction comprising hydrocarbons boiling within the gasoline range is removed through line 38 and passed through line 35 to reactor 41 along with the above mentioned heavy materials from fractionation zone 24. Heavy materials boiling above the gasoline range are removed from fractionation zone 37 through line 39 for further treatment if desired. The materials charged to reactor 41 which for the most part boil within the gasoline range, are contacted with a suitable catalyst which will isomerize olefins and remove organically combined oxygen. Examples of such catalyst are: alumina, natural clays of the bentonite type, acid treated clays, and brucite. When dehydrated bauxite is used, suitable conditions are a temperature in the range of 340 to 455° C., a space velocity in the range of 0.5 to 5 liquid volumes of charge per volume of catalyst per hour, and a pressure in the range of 0 to 150 pounds per square inch, which, however, is not critical. The conditions are so correlated that organically combined oxygen is removed and olefins are isomerized to those having a higher octane number. It is preferred to use a temperature of about 400° C. and a space velocity of about 2. Such treatment improves the stability of the gasoline and its octane number. Effluent from reactor 41 is removed through line 42 to separation and treating equipment not shown, where light gases and heavy products boiling below and above the gasoline range are removed. The product is primarily gasoline range hydrocarbons.

Some of the advantages of this invention are illustrated by the following specific example. The reactants and their proportions, and other specific ingredients and conditions, are presented as being typical and should not be construed to limit the invention unduly.

*Example*

A Fischer-Tropsch synthesis gas mixture, containing 95 mol per cent hydrogen and carbon monoxide in a ratio of 2:1 and 5 mol per cent inert material, is reacted at a temperature of 295° C. and a pressure of 300 pounds per square inch gauge in contact with a powdered iron catalyst comprising iron oxide ($Fe_3O_4$), which is reduced, promoted with 0.1 to 1 weight per cent potassium oxide ($K_2O$) and 1 to 2 weight per cent aluminum oxide ($Al_2O_3$). About 95 per cent conversion of the carbon monoxide is obtained, of which 75 per cent is converted to $C_3$ and heavier hydrocarbons and heavy oxygen-containing materials boiling above 100° C., 15 per cent to oxygen-containing materials boiling below 100° C., and the remaining ten per cent is converted to carbon dioxide, methane, ethylene, and ethane.

Of the 15 per cent oxygen-containing materials boiling below 100° C., 65 per cent are alcohols, aldehydes, ketones, and esters, and 35 per cent are fatty acids. An aqueous phase of the synthesis, containing the above-mentioned 15 per cent oxygen-containing compounds, is separated and distilled to give an azeotrope boiling below 100° C., containing alcohols, aldehydes, ketones, esters, a small portion of acids, and from 6 to 25 weight per cent water.

From 1,000,000 cubic feet of synthesis gas of the above mentioned composition reacted at the above conditions, about 400 gallons or 2100 pounds of oxygen-containing compounds boiling below 100° C. are obtained. Of this 70 weight per cent is ethyl alcohol with lesser amounts of methyl and propyl alcohols included, and about 30 weight per cent is acetaldehyde, ketones such as acetone, esters, and fatty acids. This mixture is contacted with a catalyst composed of magnesium oxide and silica at 420° C. and atmospheric pressure, yielding about 600 pounds of butadiene. About 135,000 cubic feet of off-gas is obtained, composed of 60 mol per cent hydrogen which is passed to the Fischer-Tropsch reactor, some methane, ethylene, and other minor constituents. About 150 gallons of water are obtained containing some dissolved aldol by-products, and a non-aqueous layer of pentadienes, hexadienes, and the like. The butadiene which is the main product is extracted by suitable means, such as extractive distillation or liquid-liquid extraction, and recovered.

Hydrocarbons from the Fischer-Tropsch synthesis boiling within the gasoline range plus heavy materials boiling above butadiene, and excluding water, from the butadiene synthesis are passed over anhydrous bauxite at 370° C. and a pressure of 100 pounds per square inch gauge to remove organically combined oxygen and isomerize olefins. The products from this treatment boil primarily within the gasoline range and are of improved stability and increased octane number.

This invention provides a method for converting what was formerly a waste product or a difficultly refined material to a useful product. As may be seen from the foregoing discussion, this invention comprises three cooperative steps, namely, a hydrocarbon synthesis step, a diolefin production step, and a hydrocarbon refining step, all of which cooperate to give a higher production of hydrocarbons more economically and easily from a Fischer-Tropsch synthesis.

Although this process has been described and exemplified in terms of preferred modifications, it is understood that various changes may be made without departing from the spirit and scope of the disclosure and of the claims.

I claim:

1. A combination process for manufacturing hydrocarbons, which comprises contacting a mixture of carbon monoxide and hydrogen with a Fischer-Tropsch catalyst at reaction conditions producing hydrocarbons and oxygen-containing compounds, separating effluent from said reaction into a hydrocarbon phase and an aqueous phase containing oxygen-containing compounds, separating said aqueous phase and recovering a fraction containing oxygen-containing materials and not more than 25 per cent water, contacting said fraction with a suitable catalyst at reaction conditions producing an effluent containing diolefins, separating said effluent containing said diolefins and recovering said diolefins as products of the process, contacting at least a portion of the remaining high-boiling materials from said effluent and the gasoline boiling range hydrocarbons from said Fisher-Tropsch synthesis with a suitable catalyst at reaction conditions removing organically combined oxygen and isomerizing olefins, said treated materials boiling for the most part within the gasoline range, and recovering said treated materials as products of the process.

2. A combination process for manufacturing diolefins and other hydrocarbons, which comprises contacting a mixture of carbon monoxide and hydrogen with a Fischer-Tropsch iron catalyst comprising iron oxide ($Fe_3O_4$), which is reduced, and promoted with 0.1 to 1 weight per cent potassium oxide ($K_2O$) and 1 to 2 weight per cent aluminum oxide ($Al_2O_3$) at reaction conditions producing hydrocarbons and oxygen-containing compounds, separating effluent from said Fischer-Tropsch synthesis into a hydrocarbon phase and an aqueous phase containing oxygen-containing compounds, separating said aqueous phase and recovering a fraction containing oxygen-containing materials and not more than 25 per cent water and boiling below 100° C., contacting said fraction with a suitable catalyst and recovering an effluent containing for the most part diolefins, separating said effluent from said reaction and recovering said diolefins as products of the process, contacting at least a portion of the remaining high-boiling materials from said effluent and the materials boiling within the gasoline range from said Fischer-Tropsch synthesis with a suitable catalyst at reaction conditions which will remove organically combined oxygen and isomerize olefins, said treated materials boiling for the most part within the gasoline range, and recovering said materials as products of the process.

3. A combination process for manufacturing diolefins and other hydrocarbons which comprises contacting a mixture of carbon monoxide and hydrogen in a ratio of 1:2 with a Fischer-Tropsch iron catalyst comprising iron oxide ($Fe_3O_4$), which is reduced, and promoted with 0.1 to 1 weight per cent potassium oxide ($K_2O$) and 1 to 2 weight per cent aluminum oxide ($Al_2O_3$) at reaction conditions of 290 to 325° C., 70 to 450 pounds per square inch pressure, and 1500 to 3500 volumes of gas per volume of catalyst per hour space velocity, producing hydrocarbons and oxygen-containing compounds, separating effluent from said Fischer-Tropsch synthesis into a hydrocarbon phase and an aqueous phase containing oxygen-containing compounds, separating said aqueous phase and recovering a fraction containing oxygen-containing materials and not more than 25 per cent water and boiling below 100° C., contacting said fraction with a suitable catalyst and recovering an effluent containing for the most part diolefins, separating said effluent from said reaction and recovering said diolefins as products of the process, contacting at least a portion of the remaining high-boiling materials from said effluent and the materials boiling within the gasoline range from said Fischer-Tropsch synthesis with a suitable catalyst at reaction conditions which will remove organically combined oxygen and isomerize olefins, said treated materials boiling for the most part within the gasoline range, and recovering said treated materials as additional products of the process.

4. A combination process for manufacturing butadiene and other hydrocarbons which comprises contacting a mixture of carbon monoxide and hydrogen with a Fischer-Tropsch iron catalyst comprising iron oxide ($Fe_3O_4$), which is reduced, and promoted with 0.1 to 1 weight per cent potassium oxide ($K_2O$) and 1 to 2 weight per cent aluminum oxide ($Al_2O_3$) at reaction conditions of 290 to 325° C., 70 to 450 pounds per square inch pressure, and 1500 to 3500 volumes of gas per volume of catalyst per hour space velocity, producing hydrocarbons and oxygen-containing compounds, said carbon monoxide-hydrogen mixture comprising 5 per cent inert gas and 95 per cent carbon monoxide and hydrogen in a ratio of 1:2, separating effluent from said Fischer-Tropsch synthesis into a hydrocarbon phase and an aqueous phase containing oxygen-containing compounds, separating said aqueous phase and recovering an azeotrope fraction containing oxygen-containing materials and not more than 25 per cent water and boiling below 100° C., introducing an inert diluent to said azeotrope fraction in a proportion of material to be treated to diluent of from 1:1 to 1:10, contacting said diluted material with a suitable catalyst and recovering an effluent containing for the most part butadiene, separating said effluent from said reaction and recovering said butadiene as a product of the process, contacting the remaining portion of said effluent and the materials boiling within the gasoline range from said Fischer-Tropsch synthesis with a dehydrated bauxite catalyst at 340 to 455° C., 0 to 100 pounds per square inch pressure, and 0.5 to 5 liquid volumes of charge per volume of catalyst per hour space velocity, removing organically combined oxygen and isomerizing olefins, said bauxite treated materials boiling for the most part within the gasoline range, and recovering said treated materials as further products of the process.

5. A process according to claim 4 in which the catalyst used for treating the azeotrope fraction is zinc oxide-alumina and the reaction conditions are 380 to 450° C. and a pressure of not more than 20 pounds absolute.

6. A process according to claim 4 wherein the catalyst used for treating the azeotrope fraction is magnesium oxide-silica and the reaction conditions are 380 to 450° C. and not more than 20 pounds pressure absolute.

7. A process according to claim 4 wherein the catalyst used for treating the azeotrope fraction is tantalum oxide on silica gel and the reaction conditions are 300 to 375° C. and not more than 20 pounds pressure absolute.

ALFRED CLARK.

REFERENCES CITED

The following references are of record in the file of this patent:

UNITED STATES PATENTS

| Number | Name | Date |
|---|---|---|
| 2,421,361 | Toussaint et al. | May 27, 1947 |
| 2,423,681 | Butterbaugh et al. | July 8, 1947 |
| 2,423,951 | Spence et al. | July 15, 1947 |
| 2,438,449 | Mosesman | Mar. 23, 1948 |

FOREIGN PATENTS

| Number | Country | Date |
|---|---|---|
| 735,276 | Germany | May 11, 1943 |